United States Patent
Yu

(10) Patent No.: US 10,183,259 B2
(45) Date of Patent: Jan. 22, 2019

(54) ION REMOVAL FROM WATER BY ULTRA-THIN GRAPHENE-BASED MEMBRANES

(71) Applicant: University of South Carolina, Columbia, SC (US)

(72) Inventor: Miao Yu, Pittsford, NY (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/843,145

(22) Filed: Sep. 2, 2015

(65) Prior Publication Data

US 2016/0059189 A1    Mar. 3, 2016

Related U.S. Application Data

(60) Provisional application No. 62/044,549, filed on Sep. 2, 2014.

(51) Int. Cl.

| | |
|---|---|
| *B01D 69/12* | (2006.01) |
| *C02F 1/44* | (2006.01) |
| *B01D 69/02* | (2006.01) |
| *B01D 67/00* | (2006.01) |
| *B01D 69/10* | (2006.01) |
| *B01D 71/02* | (2006.01) |
| *C01B 32/23* | (2017.01) |
| *C02F 1/00* | (2006.01) |

(Continued)

(52) U.S. Cl.
CPC ......... *B01D 69/12* (2013.01); *B01D 67/0004* (2013.01); *B01D 69/02* (2013.01); *B01D 69/10* (2013.01); *B01D 71/021* (2013.01); *C01B 32/23* (2017.08); *C02F 1/442* (2013.01); *B01D 61/027* (2013.01); *B01D 2323/30* (2013.01); *B01D 2325/04* (2013.01); *B82Y 30/00* (2013.01); *C02F 2101/006* (2013.01); *C02F 2103/08* (2013.01); *Y10S 977/734* (2013.01); *Y10S 977/903* (2013.01)

(58) Field of Classification Search
CPC ........ B01D 39/00; B01D 39/08; B01D 39/14; B01D 39/16; B01D 39/20; B01D 39/2055; B01D 39/2058; B01D 39/2065; B01D 69/12; B01D 69/122; B01D 69/125; C02F 1/44; C02F 1/442; C02F 1/444; C02F 1/58
See application file for complete search history.

(56) References Cited

U.S. PATENT DOCUMENTS

| | | |
|---|---|---|
| 9,108,158 B2 | 8/2015 | Yu |
| 2012/0171093 A1* | 7/2012 | Swager ............... C01B 31/0213 423/219 |
| 2016/0310908 A1 | 10/2016 | Yu |

OTHER PUBLICATIONS

Choi et al., Applied Materials & Interfaces, Layer-by-Layer Assembly of Graphene Oxide Nanosheets on Polyamide Membranes for Durable Reverse-Osmosis Applications, pp. 12510-12519, vol. 5, Published Nov. 12, 2013.*

* cited by examiner

*Primary Examiner* — Allison G Fitzsimmons
(74) *Attorney, Agent, or Firm* — Dority & Manning, P.A.

(57) ABSTRACT

A graphene-based membrane, along with its methods of formation and use, is provided. The graphene membrane includes at least two graphene-oxide layers. Each graphene-oxide layer has a plurality of graphene-oxide flakes, with each graphene-oxide flake having a planar graphene structure with oxygen moieties extending therefrom. The graphene-based membrane can have a thickness of about 2 nm to about 20 nm. Such a graphene-based membrane can be utilized to remove ions from water.

7 Claims, 3 Drawing Sheets

(51) Int. Cl.
*B82Y 30/00* (2011.01)
*C02F 101/00* (2006.01)
*B01D 61/02* (2006.01)
*C02F 103/08* (2006.01)

ION REMOVAL FROM WATER BY ULTRA-THIN GRAPHENE-BASED MEMBRANES

PRIORITY INFORMATION

The present application claims priority to U.S. Provisional Patent Application Ser. No. 62/044,549 titled "Ion Removal from Water by Ultra-Thin Graphene-based Membranes" of Miao Yu filed on Sep. 2, 2014, the disclosure of which is incorporated by reference herein.

BACKGROUND

Clean water is important for many industrial processes and for our daily life. The petroleum industry generates large amounts of wastewaters with high concentrations of oil, including produced water brought to the surface during oil drilling and gas production and refinery wastewater. Produced water accounts for the largest portion of wastewaters in petroleum industry and contains a wide range of contaminants, including salts, heavy metals, oil, suspended solid particles, dissolved organics, and small amount of chemical additives used for drilling, and its composition varies from well to well and from time to time. Depending on its use, produced water needs to be treated at different levels to ensure its reuse and recycling within oil and gas drilling operations, beneficial reuse outside of operations, and surface discharge. However, no matter for onshore disposal or reuse as process water or for off-shore discharge into the sea, essentially almost all oil and grease contaminants in produced water must be removed. Refinery wastewater, which constitutes another large stream of wastewaters, contains hydrocarbons even after conventional wastewater treatment due to its limited biological degradation, and thus also needs further treatment to remove remaining hydrocarbons for discharge or reuse. Hydrocyclones and dissolved air flotation have been used to quickly and effectively remove a large portion of the free oil droplets, but the quality of thus treated water is not high enough for discharge or reuse. Membrane filtration is a highly promising technology to further treat the resultant water with low concentration of oil to obtain almost oil-free water.

In particular, ion removal from water is important in water purification, such as desalination, produced water treatment in shale gas production, nuclear wastewater treatment, etc. Ion separation using membrane technology can greatly reduce energy cost in industrial processes. However, currently there are no technologies available to fabricate ultra-thin (e.g., less than 5 nm, much less sub-nanometer), graphene-based membranes that can highly selectively remove ions from water.

SUMMARY

Objects and advantages of the invention will be set forth in part in the following description, or may be obvious from the description, or may be learned through practice of the invention.

A graphene-based membrane is generally provided, along with its methods of formation and use. In one embodiment, the graphene membrane includes at least two graphene-oxide layers. Each graphene-oxide layer has a plurality of graphene-oxide flakes, with each graphene-oxide flake having a planar graphene structure with oxygen moieties extending therefrom. In one particular embodiment, the graphene-based membrane has a thickness of about 2 nm to about 20 nm. Such a graphene-based membrane can be utilized to remove ions from water. For example, water can be passed through the graphene-based membrane.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
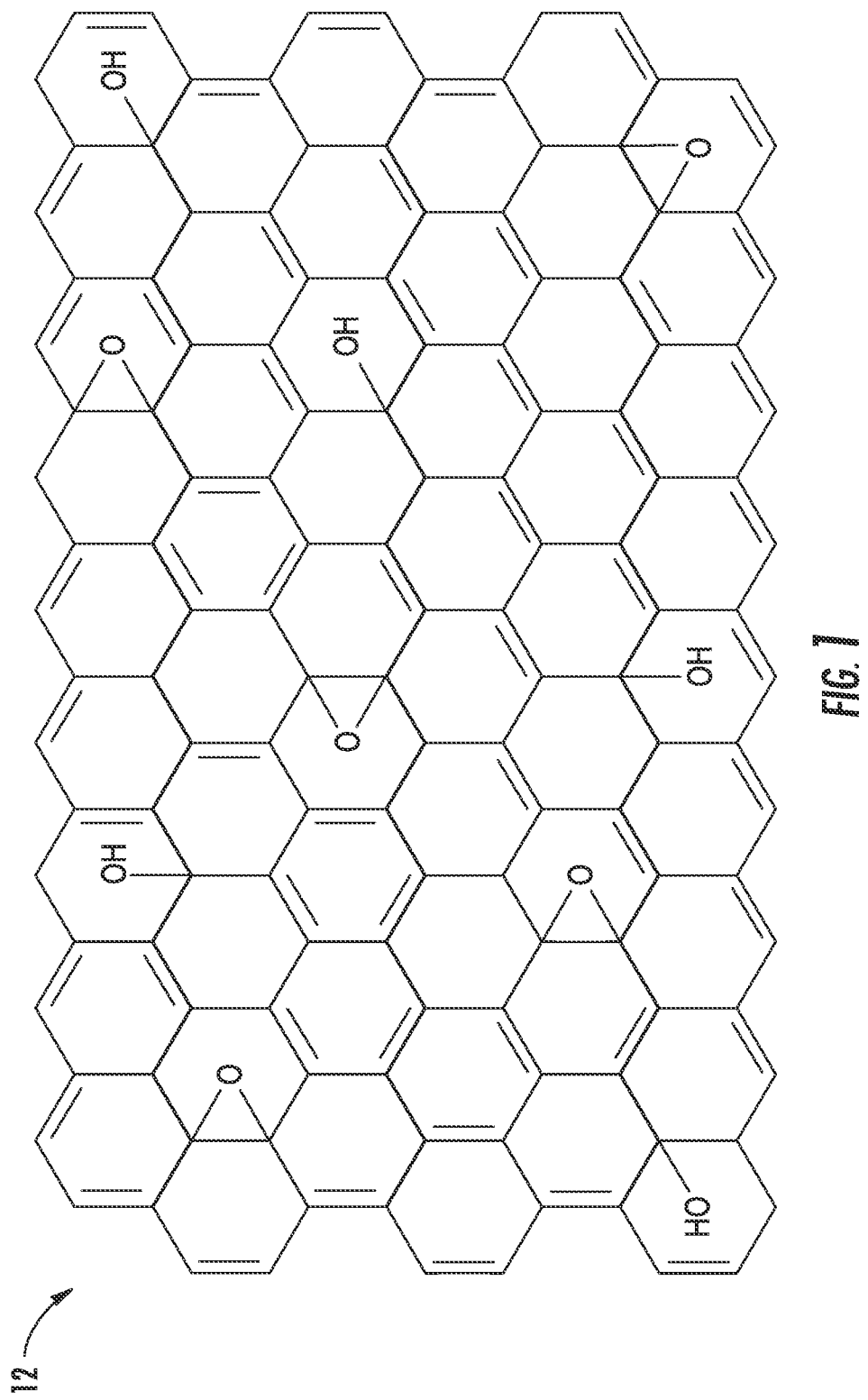
FIG. 1 shows the chemical structure of an exemplary graphene oxide layer with phenyl epoxide and hydroxyl groups extending from the basal plane of the graphene structure.

Repeat use of reference characters in the present specification and drawings is intended to represent the same or analogous features or elements of the present invention.

DEFINITIONS

As used herein, the prefix "nano" refers to the nanometer scale (e.g., from about 1 nm to about 100 nm). For example, particles having an average diameter on the nanometer scale (e.g., from about 1 nm to about 100 nm) are referred to as "nanoparticles".

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Ultra-thin graphene-based membranes are generally provided, along with their methods of production and use. The ultra-thin graphene-based membranes can be formed to achieve size exclusion for particles and/or molecules down to the sub-nanometer range. Thus, the presently present membranes can be utilized for removing ions from water, especially relatively large ions (e.g., large radioactive ions). In certain embodiments, the graphene-based membrane can be tailored as desired for ion and/or particle removal by controlling the appropriate graphene oxide (GO) flakes, GO flake deposition conditions, and/or the addition of optional interlayer locking molecules 30. Thus, the graphene-based membranes can be selectively tailored to particular sizes (e.g., sub-nanometer pores).

In one embodiment, a scalable filtration technique is provided to prepare low-cost, ultrathin (e.g., down to about 2 nm in thickness) and substantially defect-free, graphene-based membranes with tunable pore sizes (e.g., ranging from about 0.3 nm to about 20 nm). Such membranes have the great potential to revolutionize separation using membrane technology, since they can provide both high selectivity and high flux.

Tunable pore sizes, from less than about 0.4 nm (structural defects on graphene) to greater than about 10 nm (e.g., about 0.3 nm to about 20 nm, such as about 0.4 nm to about 10 nm), and ultrathin thickness (e.g., less than about 5 nm (e.g., about 2 nm to about 5 nm), allow the ultrathin, graphene-based membranes to separate ions from water (e.g., desalination and nanofiltration for water purification).

In one embodiment, single-layered graphene oxide (SLGO) powder (e.g., prepared by the Modified Hummer's Method) can be utilized as the raw material for membrane preparation. Such a SLGO powder may be fabricated or purchased commercially. The SLGO powder can be first dissolved into water (e.g., deionized water), and then sonicated to ensure dispersion of the SLGO powder in the water. Then, the dispersed SLGO powder can be centrifuged to remove any large particles/aggregates in the dispersion. Finally, the SLGO dispersion can be filtered via vacuum filtration (e.g., Millipore filtration system) through anodic aluminum oxide (AAO) filters with 20-nm pores (e.g., Whatman) or isopore cellulous acetate with 100-nm pores (e.g., Millipore). To roughly control the GO membrane thickness, the effective filtration area can be calculated, and the known amount of GO in its 25-ml dispersion can be added for filtration, assuming the membrane density is similar to that of graphite (~2.1 $g/cm^3$). The resulting GO membranes can then be stored in a vacuum desiccator (e.g., Nalgene) for a sufficient time (e.g., >15 hours) to remove the residue water.

In one example, structural defects on graphene oxide or graphene nanoflakes can be utilized to highly selectively separate ions from water. See e.g., U.S. Provisional Patent Application Ser. No. 61/914,011 titled "Ultrathin, Graphene-Based Membranes for Water Treatment and Methods of Their Formation and Use" of Miao Yu filed on Dec. 10, 2013; U.S. Provisional Patent Application Ser. No. 61/850,415 titled "Ultrathin, Molecular-Sieving Graphene Oxide Membranes for Separations" of Miao Yu filed on Feb. 14, 2013; and U.S. patent application Ser. No. 14/180,724 titled "Ultrathin, Molecular-Sieving Graphene Oxide Membranes for Separations Along with Their Methods of Formation and Use" of Miao Yu filed on Feb. 14, 2014, which are incorporated by reference herein.

I. Graphene-Oxide Layers

Figure 2:
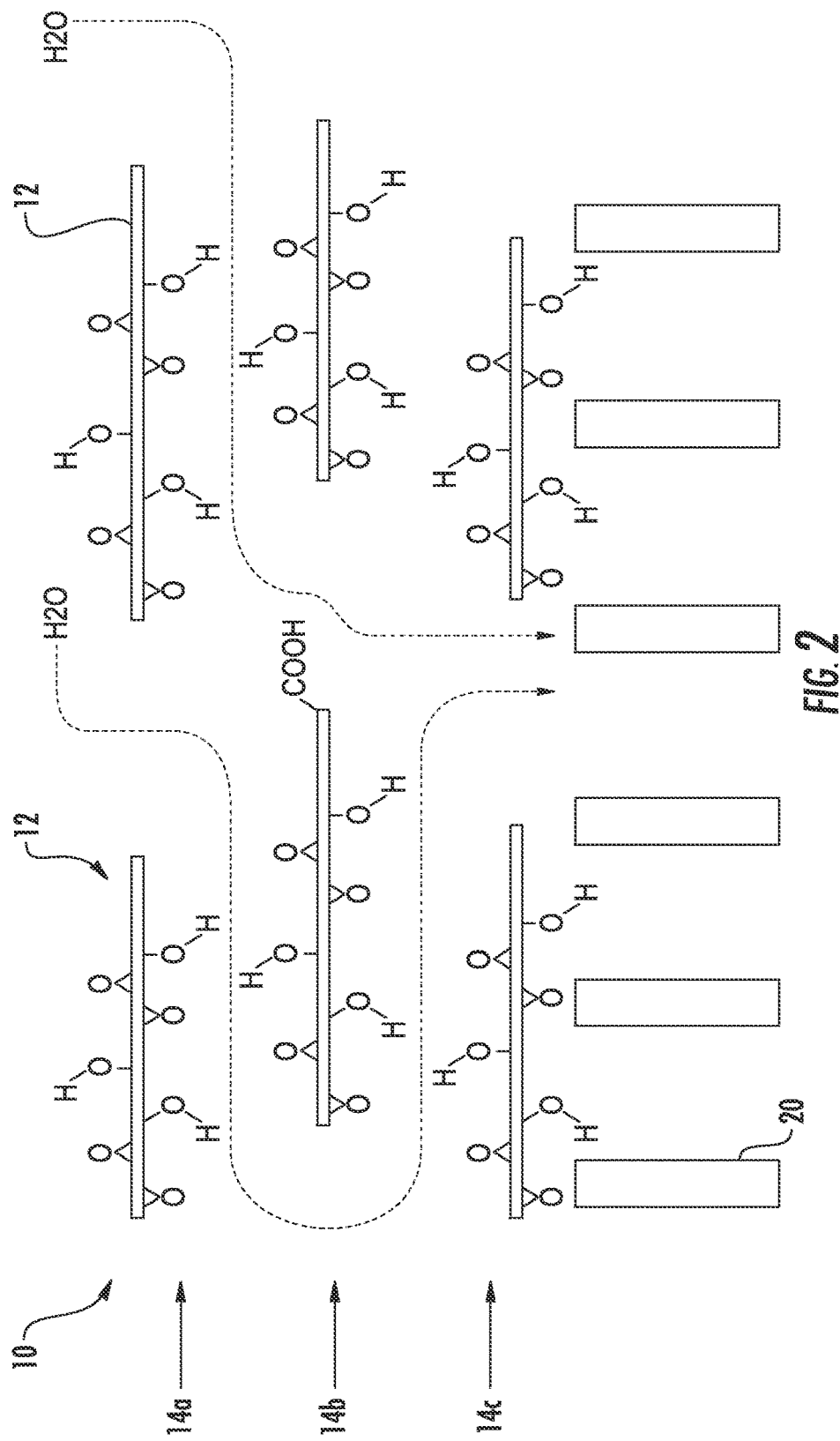
FIG. 2 shows a cross-sectional view of an ultra-thin graphene oxide membrane positioned on a porous substrate.

Graphene-based membranes have an extremely thin thickness due to the chemical structure of the individual layers of graphene. Referring to FIG. 1, a GO flake 12 is shown formed from a plurality of six-membered carbon rings to define the flat graphene flake. FIG. 2 shows a GO membrane 10 that includes a plurality of GO flakes 12 arranged in a plurality of layers 14 formed on a porous substrate 20. Although shown with three layers 14a, 14b, 14c, the GO membrane 10 can be formed through any desired number of layers 14. As understood in the art, each layer 14 has a thickness of about 1 carbon atom. Thus, the thickness of the resulting GO membrane 10 can be controlled by the number of GO layers 14 formed. For example, the thickness of the GO membrane 10 can be about 2 nm to about 20 nm, such as about 2 nm to about 10 nm. In one particular embodiment, the thickness of the GO membrane is about 2 nm to about 5 nm.

Oxygen moieties, such as the shown hyrdroxyl groups (—OH) and ether groups (—O—), extend above and below the plane of the graphene flake. Oxygen moieties may also be present on the edges of the graphene flakes, such as carboxylic acid groups (—COOH), hydroxyl groups (—OH), acetone groups (=O), etc. These oxygen moieties provide chemical interaction (e.g., ionic bonding, hydrogen bonding, van der Waals forces, etc.) between adjacent graphene layers to form the GO membrane. Additionally, the oxygen moieties provide mechanical spacing between adjacent layers by inhibiting the graphene layers from stacking directly on one another.

The concentration of the oxygen moieties in the graphene layers can be adjusted by controlling synthesis/oxidation conditions and be measured by X-ray photoelectron spectroscopy. Typical concentration of the oxygen moieties in GO is in the range of 30-40%.

This spacing allows for water molecules ($H_2O$) to travel between the adjacent graphene layers, as shown in FIG. 2. However, the adjacent graphene layers are still closely packed to each other to prevent larger atoms, ions, and/or molecules from passing therethrough. Thus, water molecules may pass through the graphene membrane while other species (e.g., ions) are prevented from passing through the graphene membrane.

II. Interlayer Locking Molecules

Figure 3:
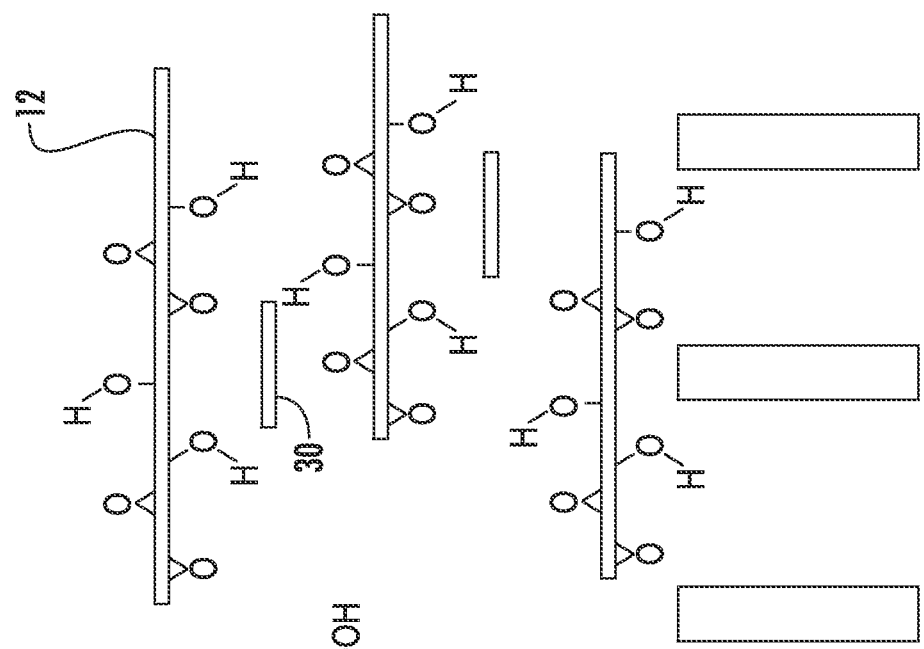
FIG. 3 shows a cross-sectional view of an ultra-thin graphene oxide membrane including an interlayer between graphene oxide layers.
Figure 3:
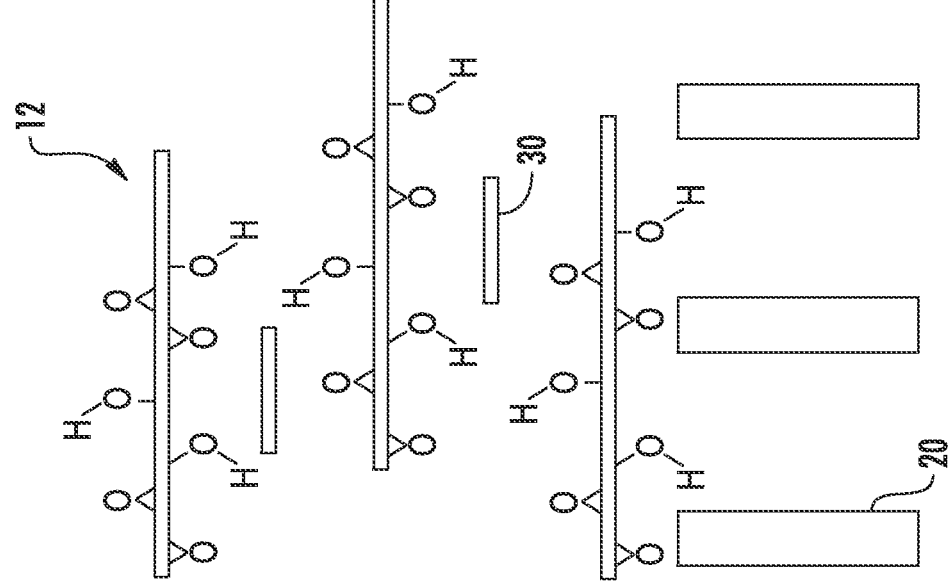

In one particular embodiment, a linking molecule 30 can be positioned between adjacent graphene layers to help control the spacing therebetween (FIG. 3), and thus the ability of molecules to flow through the GO membrane. In one embodiment, the linking molecules are a flat, benzene-ring based polycyclic aromatic hydrocarbon. Particularly suitable polycyclic aromatic hydrocarbons include, but are not limited to, naphthalene, anthracene, phenanthrene, pyrene, benzopyrene, or mixtures thereof. Derivatives of such polycyclic aromatic hydrocarbons can also be utilized, especially when containing oxygen moieties thereon.

For example, the linking molecule can be pyrene or a pyrene derivative. Pyrene is a polycyclic aromatic hydrocarbon having four fused benzene rings, resulting in a flat aromatic system. The pyrene molecule can be derivatized with oxygen species, such as described above.

Such linking molecules can interact chemically (e.g., ionic bonding, hydrogen bonding, van der Waals forces, etc.) with the oxygen moieties of the adjacent graphene layers to form the GO membrane. Such interaction can occur even without any oxygen moiety present on the linking molecule through interaction with the conjugated ring structures of the polycyclic aromatic hydrocarbons. Additionally, the linking molecules provide mechanical spacing between adjacent layers by inhibit the graphene layers from stacking directly on one another.

EXAMPLES

GO thin films have been produced that successfully rejected dye molecules with approximately 1 nm in size while allowing water to pass through the GO thin film. This result indicated great potential for removing ions from water, especially relatively large ions (e.g., large radioactive ions).

Sub-2 nm thick GO membranes were fabricated following a similar filtration process, but GO layers were deposited layer by layer by multiple filtration cycles. After GO membrane formation, they were appropriately treated in vacuum at elevated temperatures (>200° C.).

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A graphene-based membrane, comprising:
   at least two graphene-oxide layers, wherein each graphene-oxide layer comprises a plurality of graphene-oxide flakes, and wherein each graphene-oxide flake comprises a planar graphene structure with oxygen moieties extending therefrom; and
   linking molecules positioned between adjacent graphene-oxide layers and forming an interlayer, wherein the linking molecules include naphthalene, anthracene, phenanthrene, pyrene, benzopyrene, or mixtures thereof, and
   wherein the graphene-based membrane has a thickness of about 2 nm to about 20 nm.

2. The graphene-based membrane as in claim 1, wherein the graphene-based membrane has a thickness of about 2 nm to about 10 nm.

3. The graphene-based membrane as in claim 1, wherein the graphene-based membrane has a thickness of about 2 nm to about 5 nm.

4. The graphene-based membrane as in claim 1, wherein the graphene-based membrane has an average pore size of about 0.3 nm to about 20 nm.

5. The graphene-based membrane as in claim 1, wherein the graphene-based membrane has an average pore size of about 0.4 nm to about 10 nm.

6. A method of removing ions from water, the method comprising:
   passing water through a graphene-based membrane comprising at least two graphene-oxide layers, wherein each graphene-oxide layer comprises a plurality of graphene-oxide flakes, and wherein each graphene-oxide flake comprises a planar graphene structure with oxygen moieties extending therefrom; and linking molecules positioned between adjacent graphene-oxide layers and forming an interlayer, wherein the linking molecules include naphthalene, anthracene, phenanthrene, pyrene, benzopyrene, or mixtures thereof, and
   wherein the graphene-based membrane has a thickness of about 2 nm to about 20 nm.

7. The graphene-based membrane as in claim 1, wherein the graphene oxide layers have an oxygen moiety concentration from 30% to 40%.

* * * * *